Oct. 17, 1961
F. S. FLICK ET AL
3,004,574
SEALING NUT WITH PLASTIC PORTIONS HAVING SMALLER DIAMETER THREADS
Filed Jan. 16, 1956
3 Sheets-Sheet 1
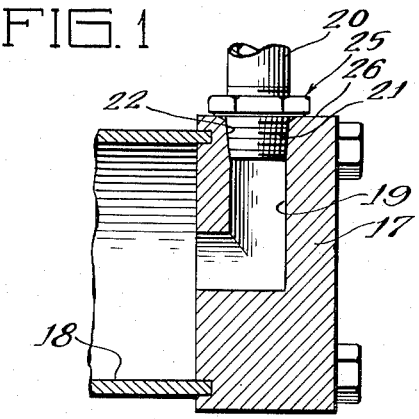
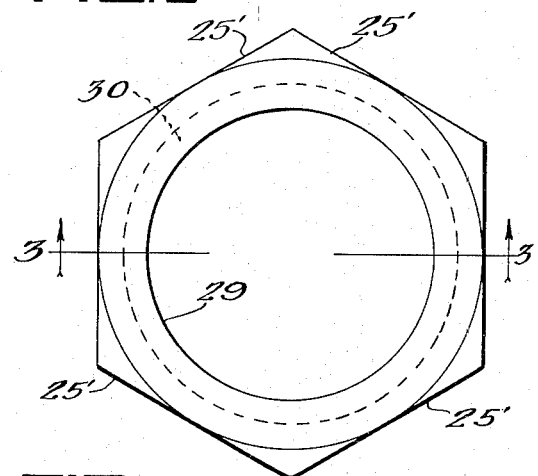
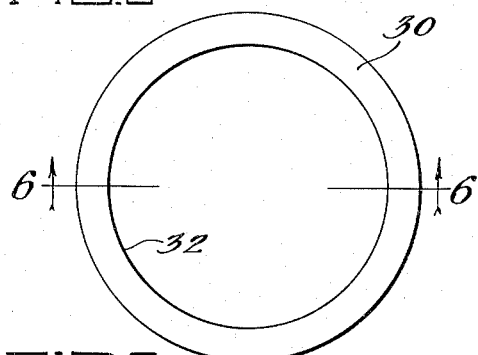
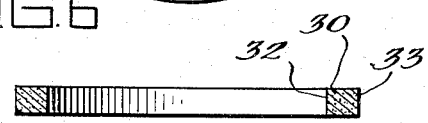
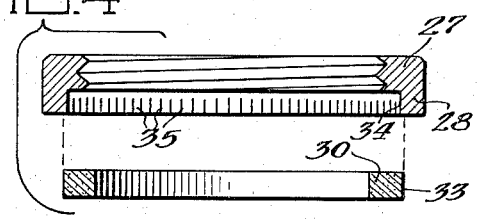
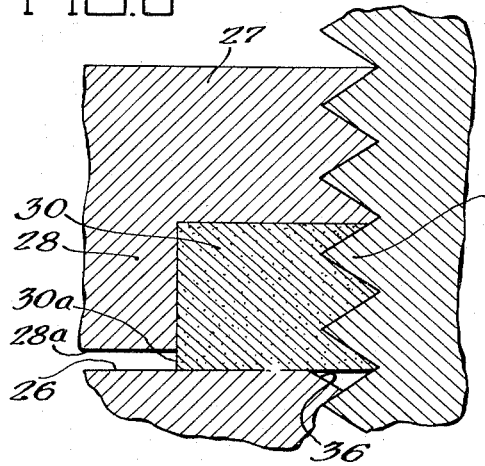
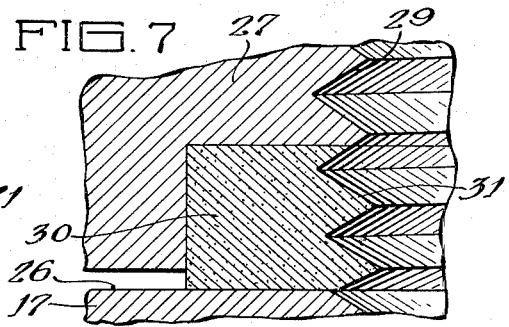
Inventors:
Francis S. Flick
Walter J. Kudlaty
By: Schroeder, Hofgren,
Brady & Wegner
Attorneys Oct. 17, 1961  F. S. FLICK ET AL  3,004,574
SEALING NUT WITH PLASTIC PORTIONS HAVING
SMALLER DIAMETER THREADS
Filed Jan. 16, 1956  3 Sheets-Sheet 2

Inventors:
Francis S. Flick
Walter J. Kudlaty
By: Schroeder, Hofgren,
Brady & Wegner
Attorneys Oct. 17, 1961 F. S. FLICK ET AL 3,004,574
SEALING NUT WITH PLASTIC PORTIONS HAVING
SMALLER DIAMETER THREADS
Filed Jan. 16, 1956 3 Sheets-Sheet 3
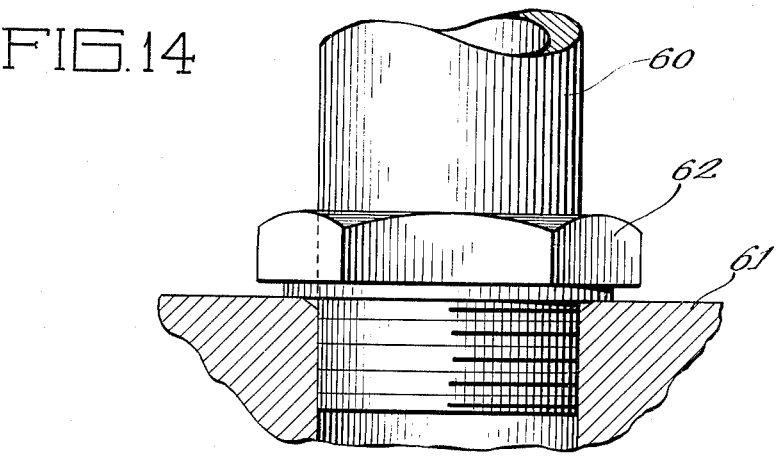
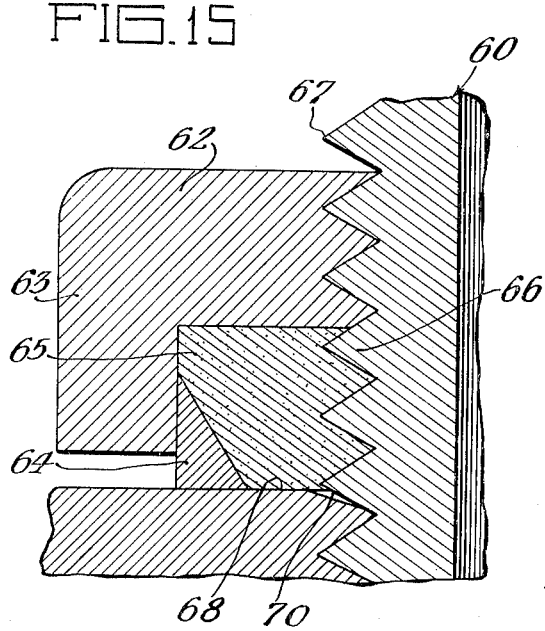
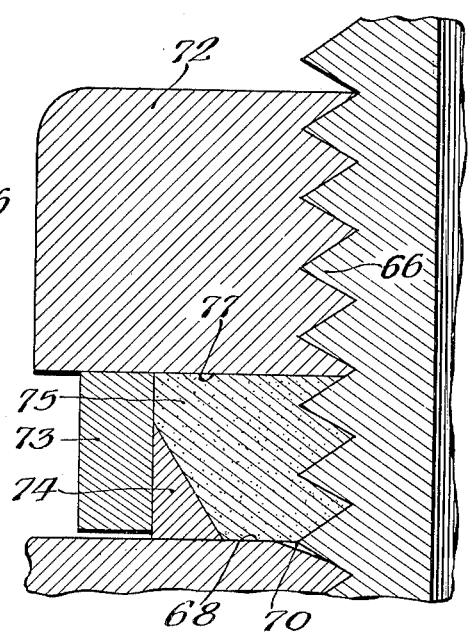
Inventors:
Francis S. Flick
Walter J. Kudlaty
By: Schroeder, Hofgren,
Brady & Wegner
Attorneys

United States Patent Office 3,004,574
Patented Oct. 17, 1961

3,004,574
SEALING NUT WITH PLASTIC PORTIONS HAVING SMALLER DIAMETER THREADS
Francis S. Flick, Oak Park, and Walter J. Kudlaty, Elmhurst, Ill., assignors to Flick-Reedy Corporation, a corporation of Illinois
Filed Jan. 16, 1956, Ser. No. 559,414
6 Claims. (Cl. 151—7)

This invention relates to a structure for sealing threadably joined members against fluid leakage.

Threaded joints in fluid carrying lines or between other threadably joined members have plagued industry for some time because of their inherent facility for leaking fluid, particularly under superatmospheric conditions. The formation of most threads leaves a slight space at the crest and root of mating threads through which liquid or gas may pass in order to escape through the threaded joint, for instance, a machine tool having a hydraulic operating circuit involving many couplings and connections will have several points at which leakage could occur. Much time, effort and money is spent attempting to correct all faulty connections and to make them fluid tight. As a result of this problem, couplings and fittings of special form and threads of special designs have from time to time been proposed. Ordinarily, these special items have been somewhat impractical, since they present no solution for all of the threaded connections presently used in industry.

One other objection to such special items is the cost which generally greatly exceeds the cost of ordinary straight or tapered threaded fittings. Additionally, any such special item would require years to come into general use throughout industry since existing fittings would have to be changed or replaced.

The present invention presents a simple solution to the problem of leakage in threaded connections. The structure herein disclosed involves a simple member which may be added to existing threaded fittings in order to seal the threads. In some embodiments, the structure takes the form of a threaded seal and in others the form of a washer, but in each there is provided a pressure seal for intimate contact with the threads between mating and joined members.

The primary object of this invention is to provide a new and improved structure for sealing threadably joined members against fluid leakage.

Another object is to provide a thread sealing unit that may be placed on existing fluid couplings without altering or changing the coupling itself.

Another object is to provide a thread sealing unit that may be easily installed in the field requiring no machining on either of the threadably joined members.

Another object is to provide a thread sealing unit which may be used with various types of threads with equal facility.

Another object is to provide a thread sealing unit which may be repeatedly used, that is, may be tightened and loosened on a threaded coupling yet will still perform its sealing function.

A further object is to provide such a unit which can seal threads against leakage in instances where the threads are only hand tightened and thus readily subject to leakage.

Other objects, features and advantages of the present invention will be apparent from the following description of several embodiments of the invention illustrated in the accompanying drawings in which:

FIGURE 1 is a fragmentary sectional view through an end of a fluid pressure cylinder showing the installation of one form of the invention therein.

FIGURE 2 is an enlarged plan view of the seal unit illustrated in FIGURE 1.

FIGURE 3 is a sectional view through the unit taken substantially along line 3—3 in FIGURE 2.

FIGURE 4 is a view similar to FIGURE 3 showing the parts of the unit prior to their assembly.

FIGURE 5 is a plan view of the resilient sealing ring of the sealing structure.

FIGURE 6 is a sectional view along line 6—6 of FIGURE 5.

FIGURE 7 is a fragmentary still further enlarged view through the sealing structure showing its form before application to threads of a coupling.

FIGURE 8 is a view similar to FIGURE 7 showing the sealing device as applied to a thread coupling.

FIGURE 14 is a fragmentary elevational view partly in section of a third form of the invention as installed on a fluid coupling.

FIGURE 15 is an enlarged vertical sectional view through one side of the sealing member shown in FIGURE 14; and, FIGURE 16 is a view similar to FIGURE 15 showing a further modified form of the thread sealing structure.

Figure 9:
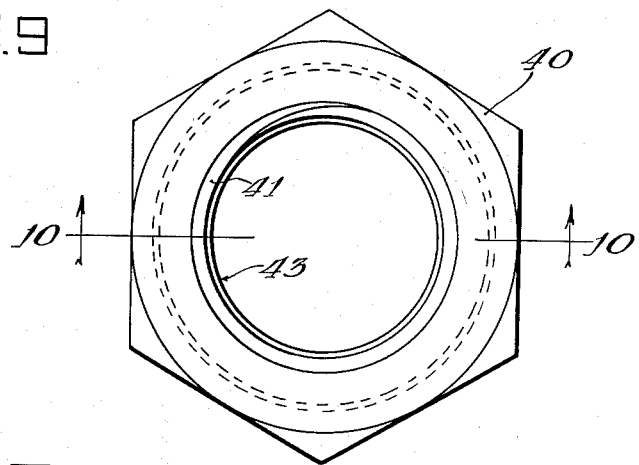
FIGURE 9 is an enlarged plan view of an alternate sealing structure.
Figure 10:
FIGURE 10 is a sectional view taken substantially along line 10—10 in FIGURE 9.

The present invention may be used in any instance where two fluid carrying members are joined by the use of threads. All that is required is that one of the members having a reasonably flat surface against which the sealing member may be turned down tight. For instance, the usual pipe couplings have a male and female member with the female member having a flat surface against which a nut could be drawn down by threading it upon the threads of the male member. To illustrate but a single use to which the present sealing structure may be put, FIGURE 1 of the drawings illustrate the head 17 of a fluid pressure cylinder joined to a tube structure 18 with a port 19 in the head structure by which a fluid line 20 may conduct fluid under pressure into the cylinder. The coupling 20 is provided with a standard pipe thread 21 which is threadably received in the outer tapped portion 22 of the port. In order to seal the mating threads between the coupling and port, the present sealing structure in the form of a nut 25 is applied to the threads on the coupling 20 and turned down against the flat surface 26 of the cylinder head. In this position, the sealing structure prevents the escape of fluid through the mating threads.

The particular sealing structure shown in FIGURES 1 to 8 is in the form of a nut. As shown in FIGURE 2, wrench flats 25' are provided on the nut which has a conventional hex configuration. As better seen in the sectional view of FIGURE 3, the nut is in two parts. The metal nut portion 27 has a depending skirt portion 28 integral therewith and receives a resilient plastic ring 30. The nut portion 27 is provided with internal threads 29 chosen so that they will mate with the threads of the coupling 20 or any other particular coupling with which the thread seal is to be used. The plastic ring 30 is also provided with internal threads 31 which comprise a continuation of the threads in the nut portion 27. The resilient ring and its nut having a continuous thread therethrough may be threaded upon a coupling such as 20 and then tightened down on the flat surface 26 after the coupling is placed in the port only hand tight. Thus, it is possible with the present sealing structure to avoid the necessity of turning all threaded couplings as tightly together as wrenches will permit. Such tightness in couplings is not required to develop the strength of the threads so that previous practice in this regard was only for the purpose of attempting to obtain a fluid tight connection. Also, fittings such as elbows and tees can be faced in any desired direction.

The particular form of the sealing structure is important to the intended function of the structure in sealing the threads. The steps followed in the formation of the sealing structure are of particular importance. The ring 30 illustrated in FIGURES 5 and 6 is preferably formed of a plastic material which may perform its intended function throughout a great temperature range and not be subject to attack by hydraulic fluids or other corrosive fluids that may be used in connection with fluid couplings. It is, therefore, preferred to form the ring 30 of tetrafluoroethylene plastic manufactured by E. I. du Pont de Nemours and known commercially as "Teflon." This material will operate in the same manner throughout temperatures from −280° F. to over 500° F. The material also is not attacked by any of the usual fluids handled in piping and the like including most acids. In fact, the material is only attacked by molten alkali metals, hot fluorine gas, chlorine trifluoride and atomic radiation. For these reasons, this material at the present time is preferred.

In the manufacture of the thread seal structure of FIGURES 1 to 8, the Teflon ring 30 is formed with concentric inner and outer cylindrical surfaces 32 and 33 respectively. The outer diameter of the ring is generally larger than the space provided within the metal nut to receive it. Thus, as illustratde in FIGURE 4, the retainer skirt 28 has an inner diameter 34 smaller than the outer diameter of the ring 30. The ring 30 must be placed in ring compression in order to install it inside the retainer ring 28 on the nut.

Means are provided to insure that the plastic ring and metal retaining ring are interlocked. As illustrated in FIGURE 4, the inner surface of the metal retaining ring 28 is provided with knurling 35 which will bite into the outer surface 33 of the Teflon ring when it is placed within the retainer. The knurling provides an interlock between the two rings and since the Teflon is in ring compression and has plastic memory, the two rings are locked together for concurrent threading upon a coupling.

The Teflon ring as mentioned above is provided with internal threads 31. These threads, however, are not formed in exactly the same manner as the threads 29 within the nut portion. To perform its sealing function, the Teflon ring is caused to enter and fill the threads against which it is forced. The threads 31 are formed on the same tap as the threads 29 in the nut, but are not turned sufficiently far on the tap to completely form them. In actual manufacturing, the threads on the nut are first formed to the full depth of the tap. Thereafter, the Teflon ring is placed in ring compression and assembled in the metal retainer. The next step involves the tapping of the Teflon. The metal nut is threaded upon the tap first so that the thread thereof will be continuous with the thread cut in the Teflon ring; however, the tap is not allowed to pass through the Teflon ring so that the resultant thread is continuous with that in the nut but of lesser depth. As illustrated in FIGURE 7, the threads 31 in the Teflon 30 in effect project radially inwardly from the threads 29 in the nut portion 27. This structure provides the Teflon ring with plastic memory forcing the threads into intimate contact with the threads 21 of a coupling member as is best illustrated in FIGURE 8.

In operation, the completed sealing structure is threaded upon the threads 21 of a coupling member sufficiently far so that the coupling member can be threaded into its mating part. The mating part need only be made hand tight and thereafter the nut may be turned down against the head surface 26 of the cylinder, for instance, so that the Teflon ring 30 is compressed between the nut portion and the head surface as illustrated in FIGURE 8. The Teflon ring has a portion 30a which extends beyond the lower edge 28a of the retaining ring so that the Teflon is first to contact the flat surface. With about one-quarter to one-half a turn on the sealing nut, after this contact is made, sufficient pressure will be placed on the Teflon to cause it to flow and fill all space between the nut, retaining ring and flat surface.

In addition to the fact that the Teflon ring is subjected to a mechanical pressure of the nut to cause it to deform and fill all of the space around the threads, the ring acts as a pressure seal. As shown in FIGURE 8, there is usually a chamfer 36 at the opening of the female threads of a coupling. Some liquid or gas as the case may be may accumulate in this space and be under pressure. This pressure is exerted against the Teflon ring in an upward direction, thus causing the ring to be pressed even tighter against the threads and in addition downwardly against the surface which it abuts. The Teflon has a character of acting much like a liquid under pressures of over 100 pounds per square inch. Thus, it can be seen that the Teflon ring seals even tighter against the threads and flat surface when pressure is applied to it in the region of the chamfer.

While the FIGURES 2 through 8 show the nut in much enlarged form, it has been found that it can be made quite thin and function satisfactorily. By way of example, a thread seal nut for a one-half inch nominal thread may be slightly less than a quarter of an inch thick in total dimension. The threads 29 in the nut portion can have from one and a half to two turns and be sufficiently strong to withstand quite high pressures. It is preferred to provide about one and a half turns in the thread formed in the Teflon ring. In this manner, at least one complete crest and root of the mating male thread of the coupling is positively sealed against the spiral path normally followed by fluid leakage.

Another form of the thread seal is shown in FIGURES 9 to 13. Herein the thread seal embodies a metal nut 40 having an internal thread 41 much similar to the embodiment of FIGURES 2 to 8. A retaining ring 42 of metal is integrally formed with the nut portion in order to receive a sealing ring 43 of Teflon. The nut portion thread 41 is continuous with the thread 44 in the Teflon ring. The form of the ring 43 is, however, slightly different from that described above.

Figure 11:
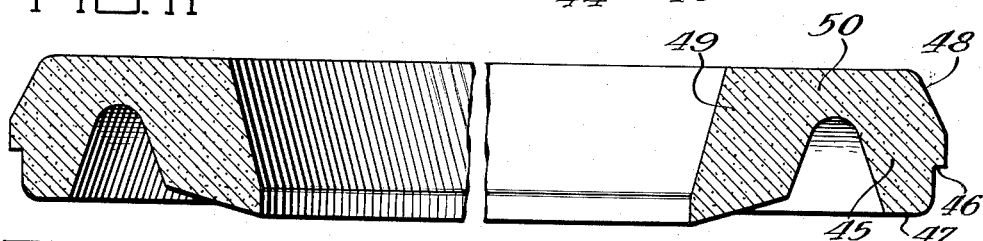
FIGURE 11 is a still further enlarged broken sectional view through the resilient sealing ring of the member illustrated in FIGURES 9 and 10.
Figure 12:
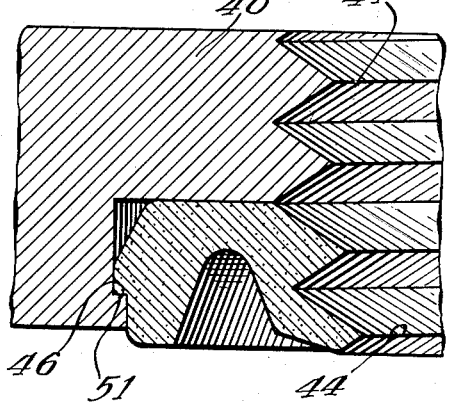
FIGURE 12 is a still further enlarged fragmentary sectional view of the structure shown in FIGURE 10 illustrating the sealing structure prior to its placement upon a threaded member.

The form of the invention illustrated in FIGURES 9 through 13 is intended to insure that the Teflon ring acts as a pressure seal. The form of the ring prior to its being installed in the metal retainer is shown in FIGURE 11. The ring has an outer leg 45 formed with a notch 46 near its outer flat surface 47 and an inwardly inclined annular surface 48. The inner leg 49 is joined to the outer by an integral base portion 50. This ring as installed in the nut is compressed in ring compression so that the lip 46 hooks over a ledge 51 provided in the nut for this purpose. A jig is used for entering the space of this generally U-shaped ring to hold it during the threading operation. The threads 44 in the ring are not cut to the depth of the threads 41 in the nut portion so that when unstressed, that is not applied to a coupling thread, the threads 41 project radially inwardly beyond the threads 41 of the nut portion.

Figure 13:
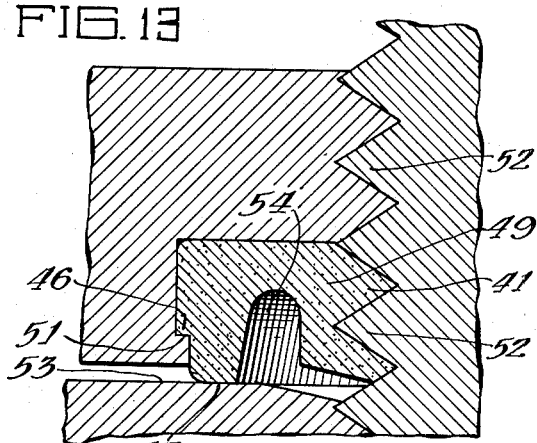
FIGURE 13 is a view similar to the view of FIGURE 12 showing the sealing structure on a threaded member.

The installation of this form of the invention on a coupling thread 52 is shown in FIGURE 13. The ring compression and the interlock provided by the ledge 51 and lip 46 hold the Teflon ring in the nut against relative rotation. The act of threading the nut upon the threads 52 causes the inner leg 49 to move toward the outer leg. Thus, its threads 41 have a tendency to move into and toward the threads of the coupling. The bottom surface 47 may abut a flat surface 53 on one part of the coupling. By tightening the nut, the Teflon ring is placed under axial compression insuring a tight fit between the ring and the coupling surface. Some irregularity in the coupling surface may be accommodated by deformation of the Teflon ring.

The form of the invention shown in FIGURES 9 to 13 will seal with pressure since any leakage along the coupling threads will be led to the space 54 within the ring. Pressure within this space tends to spread the legs of the ring outwardly into more intimate contact with the metal parts of the coupling. Thus, as the pressure is increased, the effectiveness of the seal provided is also increased.

In some instances, it is preferred to seal threads under a bolt head or in other instances, use may require the nut to be a separate member from the sealing structure. In FIGURE 14 a coupling including a tube 60 is shown as threaded into a mating member 61 with straight threads. A nut 62 is threaded upon the threads of the tube and cooperates with a slightly modified form of sealing structure. In FIGURE 15, it will be noted that the nut 62 has a depending annular ring portion 63 in sliding contact with a wedge shaped annular ring 64. A ring of Teflon material 65 is positioned between the wedge shaped ring and the threads 66 of the tube. This ring prior to deformation so as to fill the spaces between the threads had a cylindrical inner surface which would fit over the crests 67 of the threads 66. In this manner, the Teflon ring and the wedge shaped ring 66 could be slipped over the male threads of the tube 60 and thereafter the nut 62 brought down to bear against the Teflon. The retaining ring 63 prevents radial outward movement of the Teflon and cooperates with the wedge shaped ring to confine the Teflon. As pressure is applied, the ring is caused to deform and mold itself around the threads 66 as well as to intimately contact the flat surface 68 of the companion coupling member.

A still further modification of the sealing structure is illustrated in FIGURE 16 wherein the nut 72 is entirely independent of the sealing structure. A retaining ring washer 73 is in sliding contact with a wedge shaped ring washer 74 forming a metal barrier around the Teflon ring maintaining it against radial outward movement. As the nut 72 is drawn down on the threads 66, its lower surface 77 contacts the Teflon ring 75 as well as the ring washer 73. This action confines the Teflon ring against movement except into and about the threads 66. Here, also, the Teflon ring had a cylindrical inner surface to being deformed so as it could slip over the male coupling threads.

Both of the forms of the invention illustrated in FIGURES 15 and 16 operate to seal with pressure, that is, any pressure applied to the lower surface of the Teflon ring in the chamfer space 70 causes the ring to press more firmly into the threads and against the flat surface of the companion coupling.

One particular advantage of the present invention is its ease of installation in existing piping, tubing or other fluid connections. Generally, all such connections have some threads exposed beyond the coupling. In such instances, a thread seal nut may be threaded onto these threads and thereafter pulled down tight against the companion coupling to thoroughly and completely seal the threads against leakage. It has been found that the thread seal nut may be repeatedly used without affecting the tightness of the seal provided. Another important feature of the invention is the fact that this seal structure may be applied to existing fittings in the field without altering the fitting in any respect. Additionally, such fittings need only be made hand tight and then the seal nut be tightened down against the coupling to effect a perfect seal of the threads against leakage.

The foregoing detailed description has been given for clearness of understanding only, and no unnecessary limitations should be understood therefrom, for some modifications will be obvious to those skilled in the art.

We claim:

1. A thread sealing structure, comprising: an annular ring of resilient tetrafluoroethylene plastic material deformable under influence of pressure exerted thereon and adapted for placement about threads to be sealed, said ring being internally threaded; an annular ring of metal about the plastic ring in intimate contact therewith for holding the ring against radial outward distortion, said plastic ring having one face portion extending axially beyond the metal retaining ring for contact against a surface, said plastic ring being engageable on its opposite face portion by a nut portion threaded on said threads, said nut portion and ring portion having an internal thread with walls that are continuous and with the thread in the nut portion being fully formed and the thread in the plastic ring portion being formed to extend inwardly to a greater extent than the threads in the nut portion so as to fill and yieldingly press inwardly about the threads to be sealed, said nut portion being adapted for applying pressure to the plastic ring between said faces to urge the ring radially inwardly to maintain the threads to be sealed filled with said ring material and sealed against fluid leakage.

2. A sealing structure as specified in claim 1 wherein the annular retaining ring has two portions including an outer ring and an inner ring concentric therewith, the inner ring being wedge shaped in section for forcing the resilient ring material radially inward.

3. A sealing structure as specified in claim 1 wherein the resilient ring is generally U-shaped in section with the base of the U against the nut portion so that fluid pressure may be applied on the inner portion of the ring to aid in forcing the ring material into sealing engagement with threads.

4. A sealing structure for preventing fluid leakage between threadably joined members, comprising: a metal nut having an outer configuration including wrench flats and an annular retaining ring portion on one face; a resilient tetrafluoroethylene plastic ring positioned in said nut and bearing radially outwardly against said retaining ring portion; an internal thread formed continuously in said nut and resilient ring with the threads in the latter being of lesser depth than those in the nut and extending inwardly beyond the projection of the threads in the nut, and said resilient ring projecting beyond the retaining ring portion forming a generally flat face for abutting a surface about the mating threads to be sealed when the nut is threaded upon external threads of said mating threads so as to press the resilient ring against said surface and into said external threads.

5. A sealing structure as specified in claim 4 wherein the plastic ring is generally U-shaped in section with the space between the legs being exposed so that fluid pressure may be exerted within the ring to aid in pressing the ring against the parts to be sealed.

6. A thread sealing structure, comprising: an annular ring of resilient synthetic resin material having properties of high inertness to chemical fluids and solvents, non-adhesiveness, retentivity of physical properties throughout a wide range of ambient temperatures and pressures, deformability under influence of pressure exerted thereon, and being adapted for placement about threads to be sealed, said ring being internally threaded; an annular ring of metal about the resin ring in intimate contact therewith for holding the resin ring against radial outward distortion, said resin ring having one face portion extending axially beyond the metal retaining ring for contact against a surface, said resin ring being engageable on its opposite face portion by a nut portion threaded on said threads, said nut portion and resin ring portion having an internal thread with walls that are continuous and with the thread in the nut portion being fully formed and the thread in the resin ring portion being formed to extend inwardly to a greater extent than the threads in the nut portion so as to fill and yieldingly press inwardly about the threads to be sealed, said nut portion being adapted for applying pressure to the resin ring between said faces to urge the ring radially inwardly to maintain the threads to be sealed filled with said resin ring material and sealed against fluid leakage.

References Cited in the file of this patent

UNITED STATES PATENTS

| | | |
|---|---|---|
| 267,862 | Fletcher | Nov. 21, 1882 |
| 2,087,185 | Dillon | July 13, 1937 |
| 2,340,589 | Harpoothian | Feb. 1, 1944 |
| 2,421,105 | Warren | May 27, 1947 |
| 2,464,379 | Courtot | Mar. 15, 1949 |
| 2,502,642 | Currlin | Apr. 4, 1950 |
| 2,704,676 | Harding | Mar. 22, 1955 |